United States Patent
Aiken et al.

(10) Patent No.: US 6,757,675 B2
(45) Date of Patent: Jun. 29, 2004

(54) METHOD AND APPARATUS FOR INDEXING DOCUMENT CONTENT AND CONTENT COMPARISON WITH WORLD WIDE WEB SEARCH SERVICE

(75) Inventors: Alex Aiken, Stanford, CA (US); Saul Schleimer, Los Gatos, CA (US); Joel Auslander, San Mateo, CA (US); Daniel Wilkerson, Berkeley, CA (US); Anthony Tomasic, San Francisco, CA (US); Steve Fink, San Carlos, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 10/365,839

(22) Filed: Feb. 12, 2003

(65) Prior Publication Data

US 2003/0120647 A1 Jun. 26, 2003

Related U.S. Application Data

(63) Continuation of application No. 09/624,517, filed on Jul. 24, 2000, now abandoned.

(51) Int. Cl.[7] .............................................. G06F 17/30
(52) U.S. Cl. ............................................. 707/3; 707/4
(58) Field of Search ........................ 707/2, 3, 10, 102, 707/103 R; 700/92; 705/1; 709/217, 310

(56) References Cited

U.S. PATENT DOCUMENTS

| | | | |
|---|---|---|---|
| 5,915,251 A | 6/1999 | Burrows et al. ............ 707/102 |
| 5,974,412 A | * 10/1999 | Hazlehurst et al. ............ 707/3 |
| 6,021,409 A | * 2/2000 | Burrows ...................... 707/102 |

OTHER PUBLICATIONS

Sudarshan et al. Database System Concepts McGraw–Hill, Third Edition, pp. 358–367.*
Koster, M. (1995). "Robots in the Web: threat or treat?" located at: <http://info.webcrawler.com/mak/projects/robots/>, 12 pages.
Koster, M. (1993). "Guidelines for Robot Writers," located at: <http://info.webcrawler.com/mak/projects/robots/guidelines.html>, 5 pages.
Koster, M. (1996). "Evaluation of the Standard for Robots Exclusion," located at: <http://info.webcrawler.com/mak/projects/robots/eval.html>, 7 pages.

* cited by examiner

*Primary Examiner*—Diane D. Mizrahi
*Assistant Examiner*—Apu M Mofiz
(74) *Attorney, Agent, or Firm*—Morrison & Foerster LLP

(57) ABSTRACT

Methods and related systems for indexing the contents of documents for comparison with the contents of other documents to identify matching content. A method for comparing the contents of a query document to the content on the World Wide Web is set forth. The contents of a query document are indexed and compared to content from the World Wide Web which is continuously retrieved and indexed. The method for indexing may comprise selecting substrings from the document, hashing the substrings to generate a plurality of hash values having a known range of values, selecting certain hash values to save from the generated hash values, and sorting the saved hash values. Methods for selecting certain hash values to save are set forth.

21 Claims, 11 Drawing Sheets

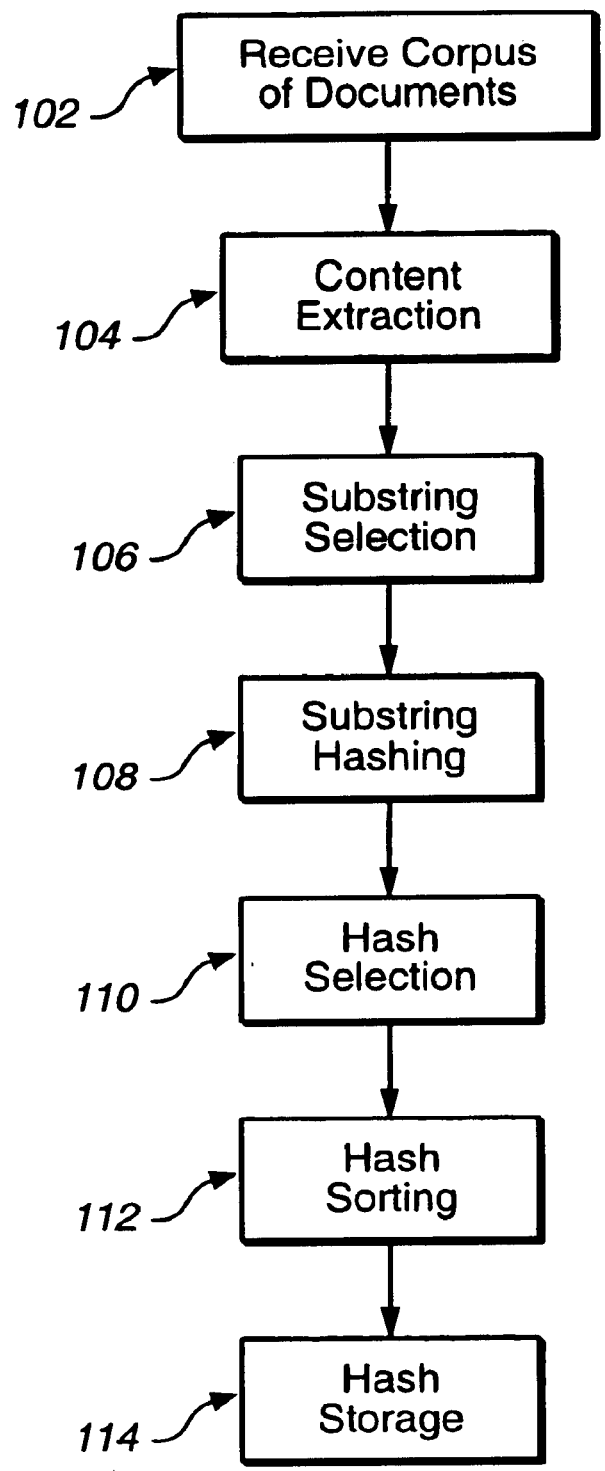
*FIG._1*

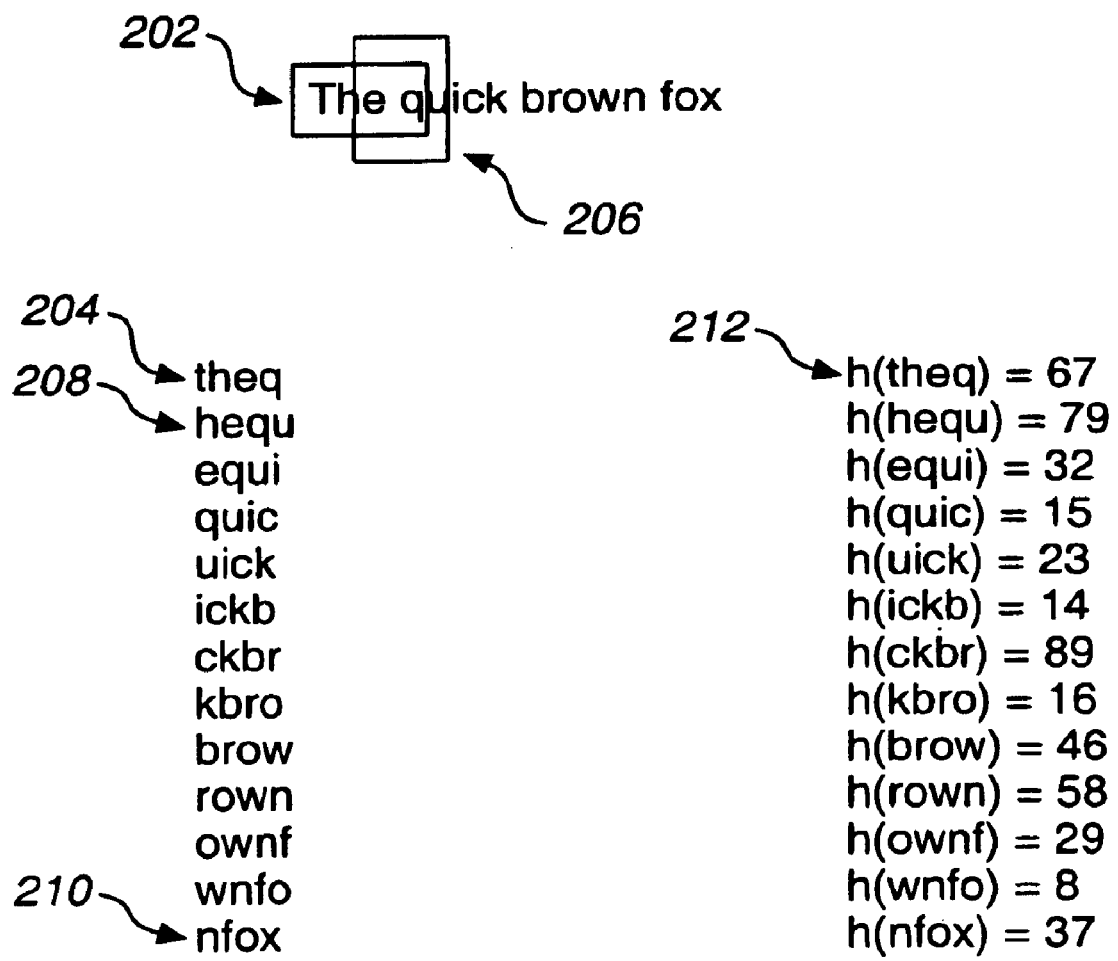
FIG._2

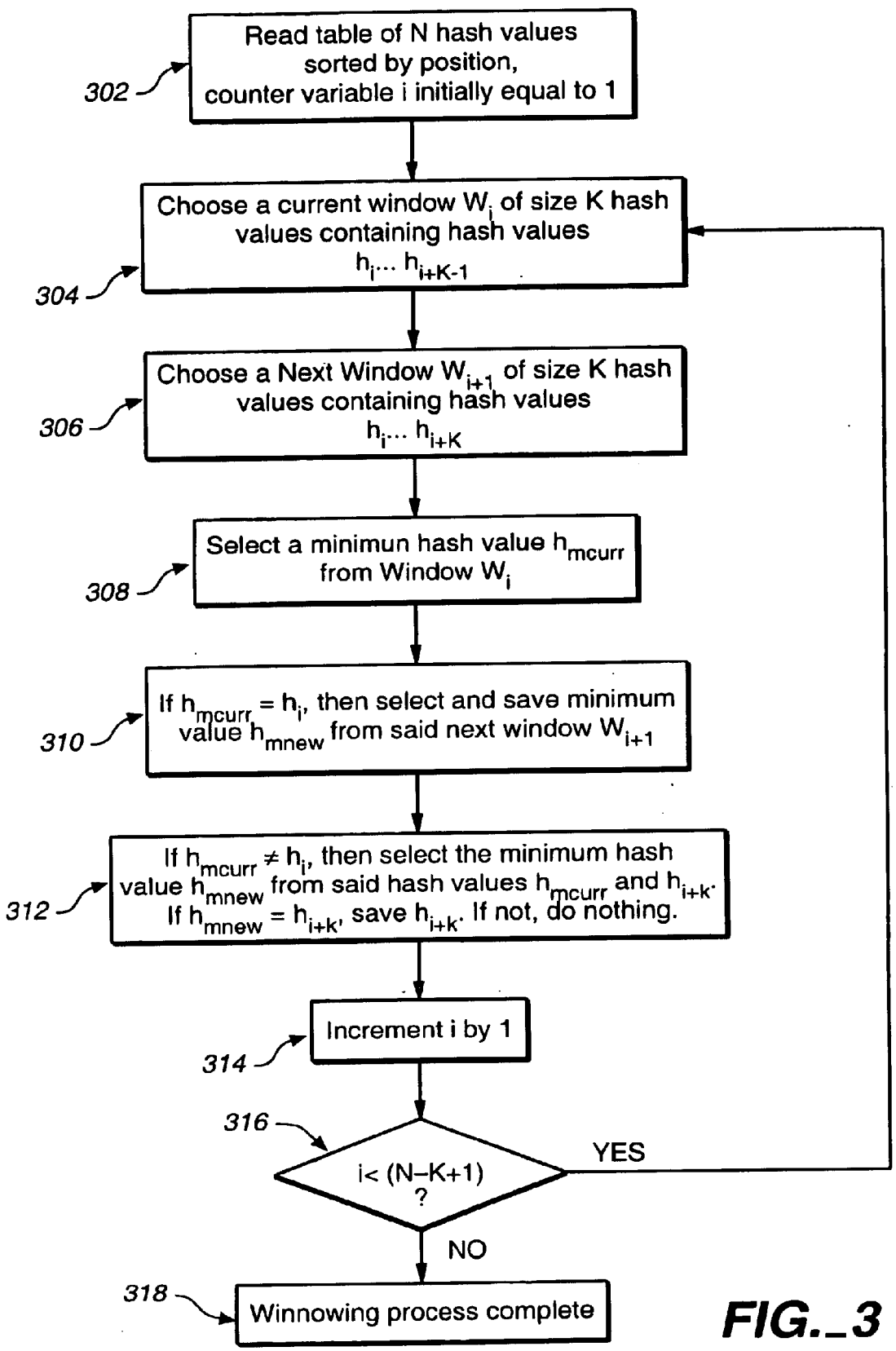
FIG._3

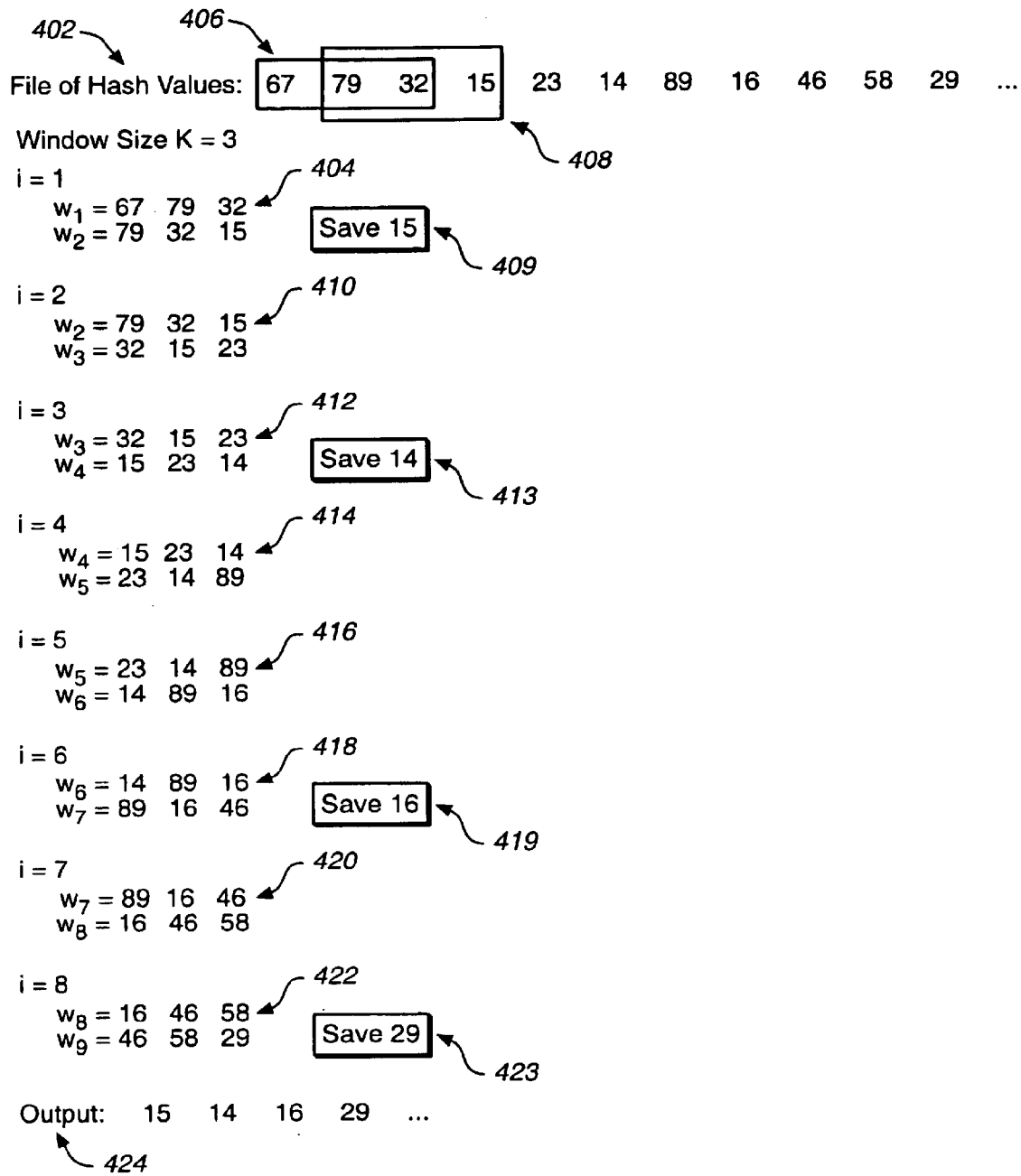
FIG._4

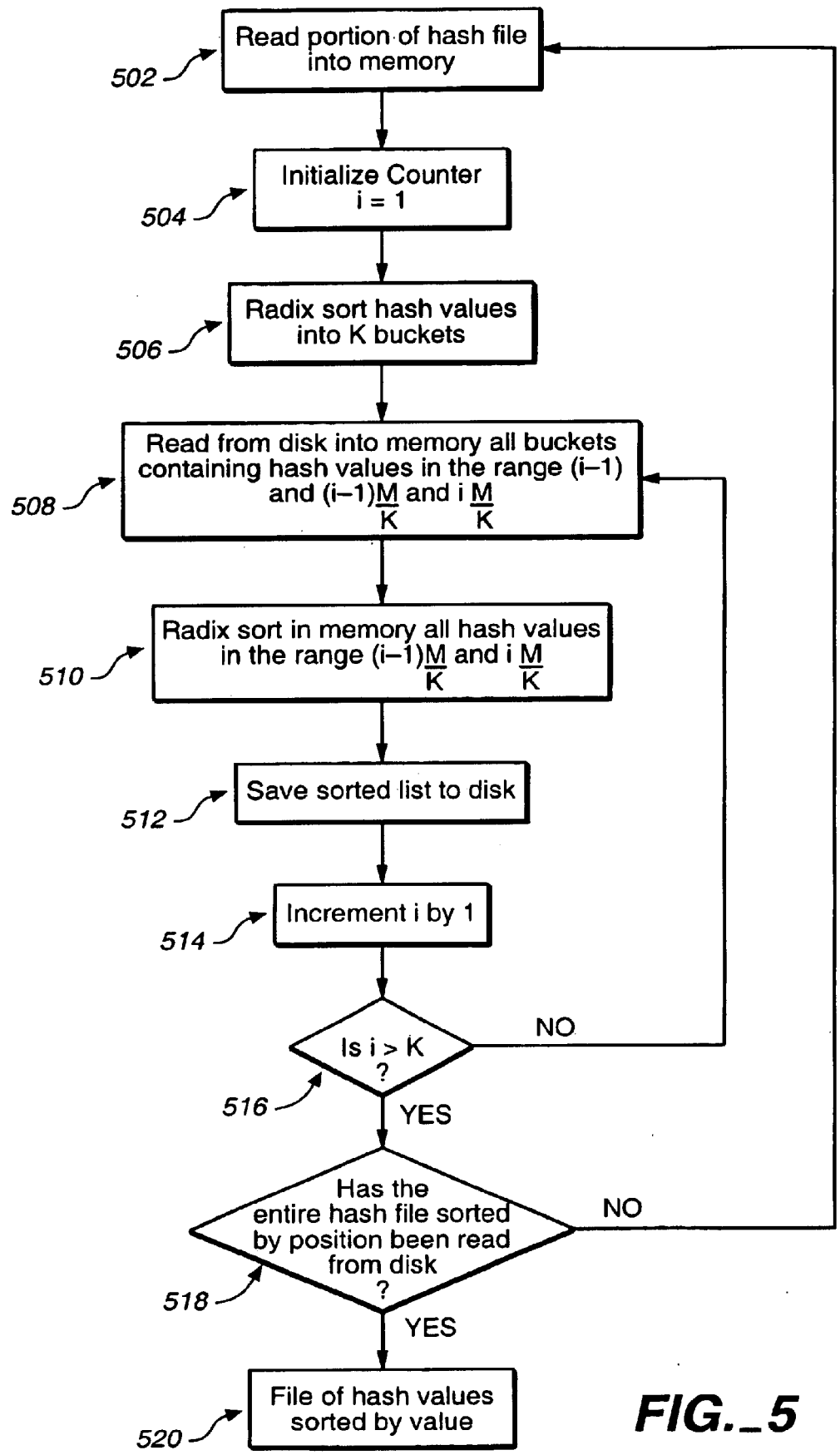
FIG._5

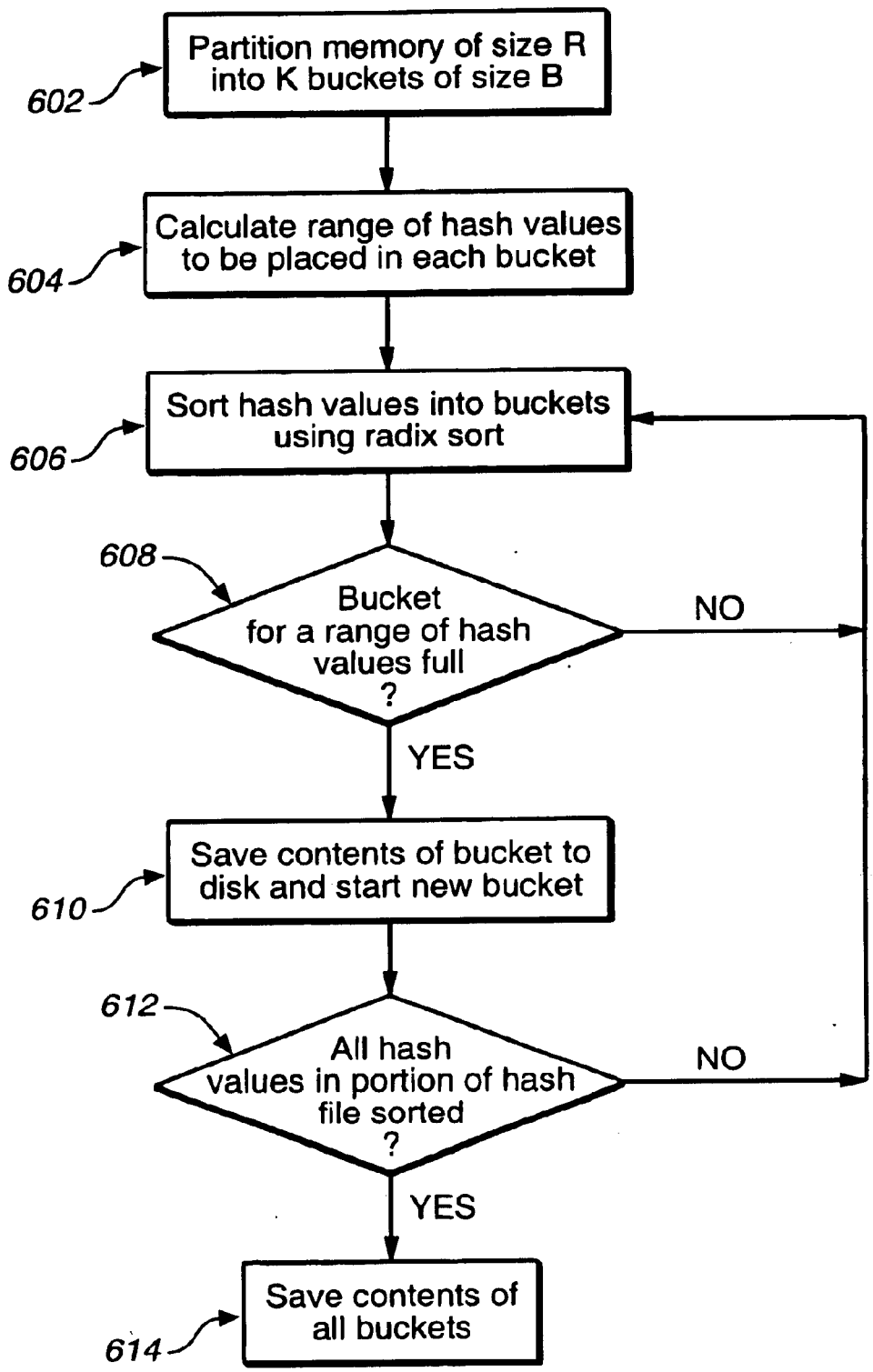
FIG._6

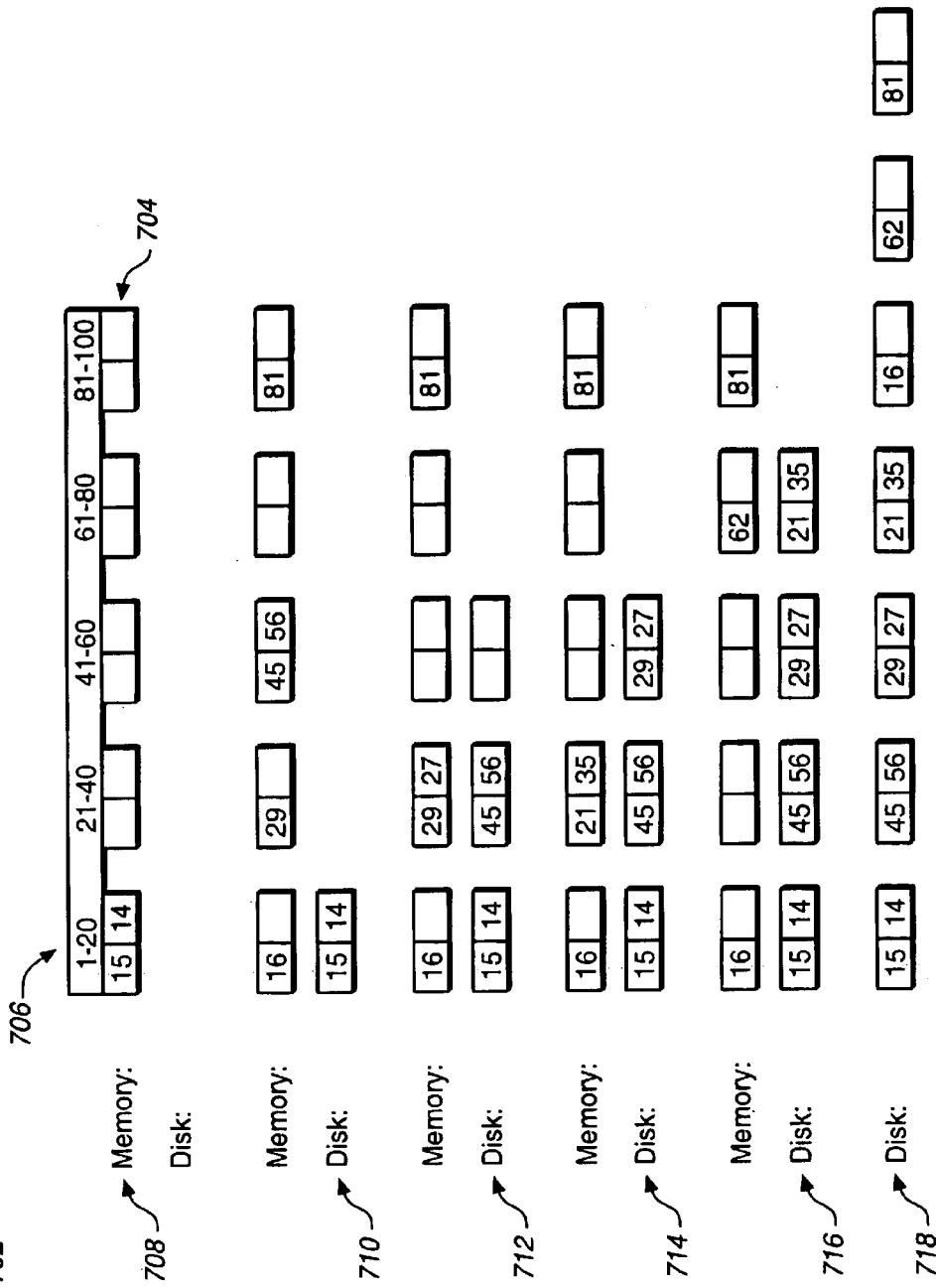
FIG._7

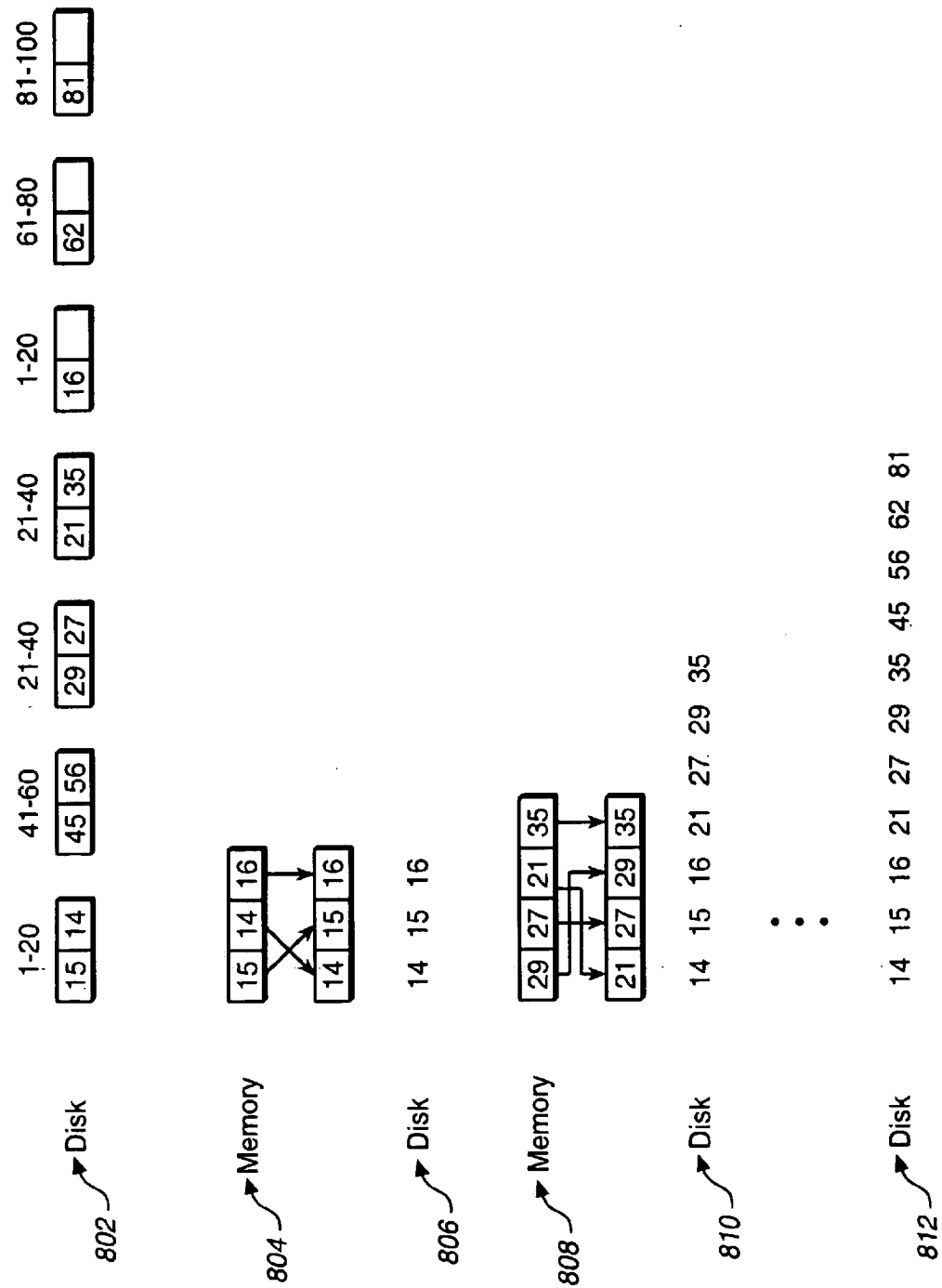
FIG._8

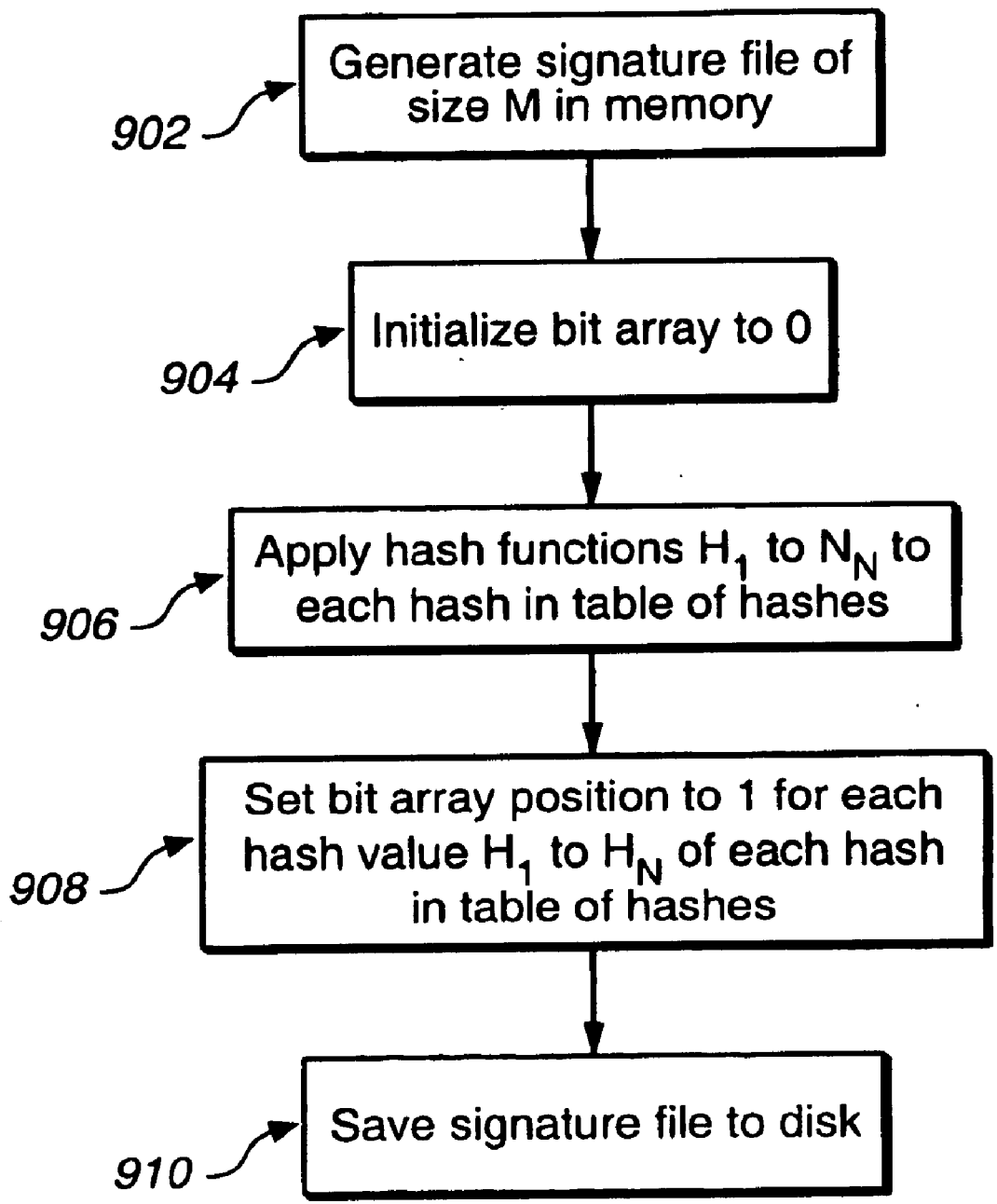
FIG._9

1002 Generate and initialize bit array

| 0 | 0 | 0 | 0 | 0 | 0 | 0 | 0 | 0 | 0 | • | • | • | 0 | 0 | 0 | 0 | 0 | 0 | 0 | 0 | 0 | 0 | 0 | • | • | • | 0 | 0 | 0 | 0 | 0 | 0 | 0 | 0 | 0 | • | • | • | 0 |
|---|---|---|---|---|---|---|---|---|---|---|---|---|---|---|---|---|---|---|---|---|---|---|---|---|---|---|---|---|---|---|---|---|---|---|---|---|---|---|---|
| 1 | 2 | 3 | 4 | 5 | 6 | 7 | 8 | 9 | 10 | | | | 45 | 46 | 47 | 48 | 49 | 50 | 51 | 52 | 53 | 54 | 55 | 56 | | | | 81 | 82 | 83 | 84 | 85 | 86 | 87 | 88 | 89 | | | | M |

1004 Apply hash functions $H_1$ to $H_N$ to each hash value in hash table $H_1(14) = 5$   $H_1(15) = 9$   $H_1(81) = 48$
$H_2(14) = 45$  $H_2(15) = 51$  $H_2(81) = 87$
$H_N(14) = 84$  $H_N(15) = 56$  $H_N(81) = 89$ 1006 Set corresponding bit positions to 1

| 0 | 0 | 0 | 0 | 1 | 0 | 0 | 0 | 1 | 0 | • | • | • | 1 | 0 | 1 | 0 | 0 | 0 | 1 | 0 | 0 | 0 | 0 | 1 | • | • | • | 0 | 0 | 0 | 0 | 0 | 0 | 1 | 0 | 1 | • | • | • | 0 |
|---|---|---|---|---|---|---|---|---|---|---|---|---|---|---|---|---|---|---|---|---|---|---|---|---|---|---|---|---|---|---|---|---|---|---|---|---|---|---|---|---|
| 1 | 2 | 3 | 4 | 5 | 6 | 7 | 8 | 9 | 10 | | | | 45 | 46 | 47 | 48 | 49 | 50 | 51 | 52 | 53 | 54 | 55 | 56 | | | | 81 | 82 | 83 | 84 | 85 | 86 | 87 | 88 | 89 | | | | M |

*FIG._10*

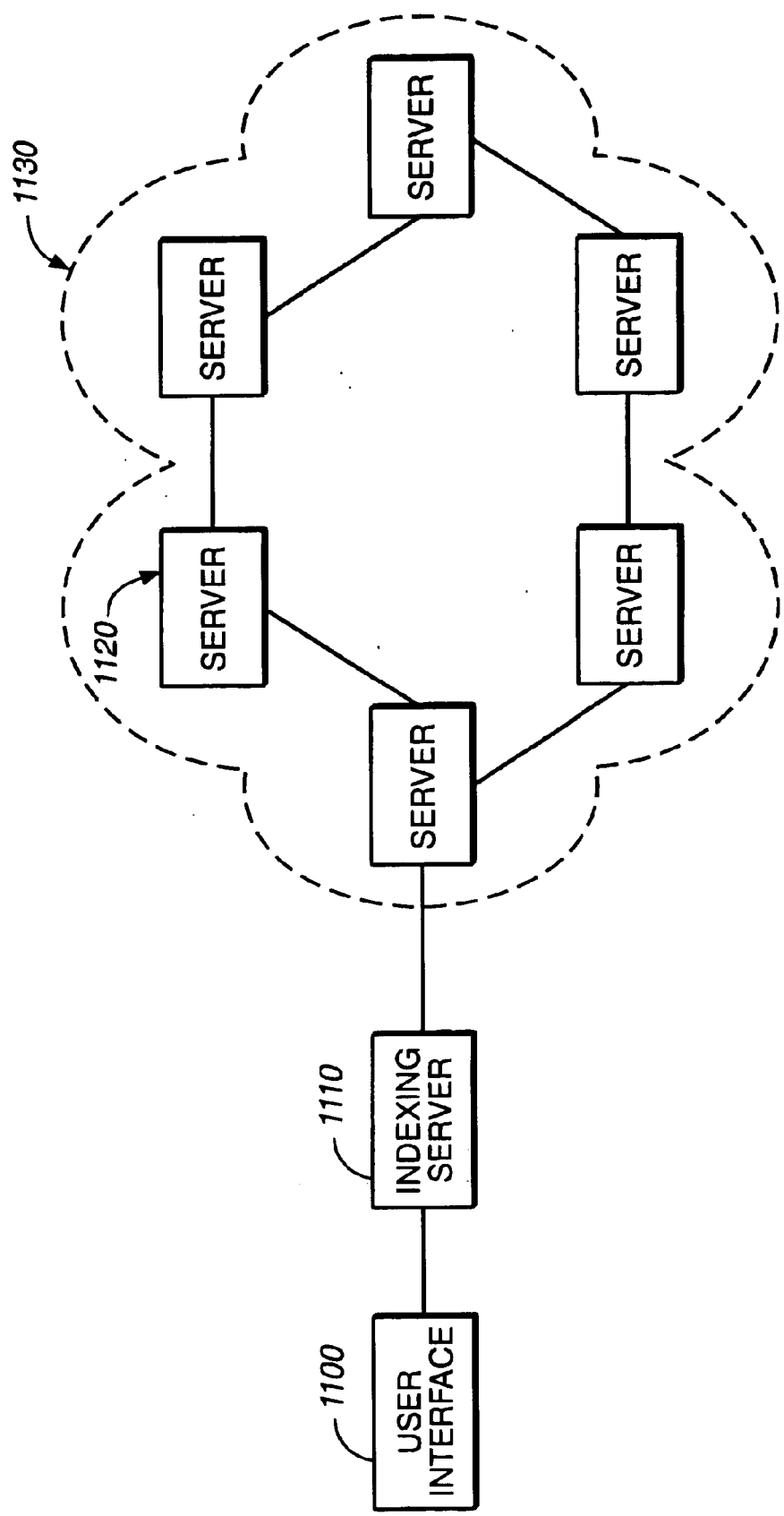
FIG._11

METHOD AND APPARATUS FOR INDEXING DOCUMENT CONTENT AND CONTENT COMPARISON WITH WORLD WIDE WEB SEARCH SERVICE

CROSS-REFERENCE TO RELATED APPLICATIONS

This application is a continuation of U.S. patent application Ser. No. 09/624,517, filed Jul. 24, 2000, now abandoned which is incorporated by reference herein in its entirety.

BACKGROUND OF THE INVENTION

1. Field of the Invention

This invention relates generally to data processing and, in particular, to methods and related systems for indexing the contents of documents for comparison with the contents of other documents to determine similarity.

2. Description of the Related Art

Traditionally, word processing programs and operating systems often have had the ability to compare the contents of files and provide information on differences or similarities in content between files. There are a variety of file comparison programs currently available, each of which may be adequate in certain respects, but have drawbacks which make them poorly suited for certain applications. The proliferation of Internet usage and the ease in which information can be posted, searched for, and retrieved from the Internet has resulted in the Internet becoming a primary source of information. This proliferation has resulted in an increased posting of copyrighted material on the Internet which has not been authorized. In addition, much of the information posted is not removed in a timely manner resulting in duplicate or near duplicate material on the Internet. As information becomes updated, previous versions of the information posted on the Internet may still remain, resulting in large quantities of outdated information on the Internet. While searching for material on the Internet, it may be desirable to identify and skip over such outdated content, or identify such outdated content so that it can be deleted. The proliferation of Internet usage has thus resulted in an increased need for methods and systems for comparing documents and identifying matching content.

Several methods of comparing files can be categorized as information retrieval methods, which compare statistical profiles of documents. For example, one method computes a histogram of word frequencies for each document, or a histogram of the frequency of certain pairs or juxtaposition of words in a document. Documents with similar histograms are considered to be similar documents. Refinements of these methods include preprocessing of documents (e.g., removal of common or unimportant words) prior to statistical profile computation and applying the same information retrieval method to subsections of documents. A primary limitation of information retrieval methods is that they have tendencies to provide false positive matches which are difficult to prevent, since dissimilar documents may often have similar statistical profiles.

Another method of comparing documents is known as document "fingerprinting", which involves computing hashes of selected substrings of documents. A particular set of substring hashes chosen to represent a document is the document's fingerprint. Documents are compared by comparing the substring hashes making up the fingerprints of the documents. The more substring hashes chosen, the more accurate the document's fingerprint for comparison to another document. However, if too many hashes are chosen, the data processing system may be unable to handle large quantities of documents. The similarity of two documents is defined as a ratio C/T where C is the number of hashes the two documents have in common and T is the total number of hashes saved from one of the documents. Assuming a well-behaved hash function, this ratio is a good estimate of the actual percentage overlap between the two documents. However, this also assumes that a sufficient number of substring hashes are saved.

In the past, various approaches have been used to determine which substrings in a document are selected for hashing and which of these hashes are saved as part of the document fingerprint. One approach is to compute hashes of all substrings of a fixed length k and retain those hashes that are evenly divisible by some integer p, 0 mod p for some integer p. A second approach is to partition the document into substrings with hashes that are 0 mod p and save those hashes. In this second approach, the substrings selected are not of a fixed length. Rather, a character is added to the substring until the hash of the substring is 0 mod p, at which point the hash is saved and the next substring is started.

However, because these methods depend on the hash values of the document substrings in determining which hash values are saved, there may be large gaps in a document where no hash value will be saved and there may be portions where an excess of hash values are saved. If gaps between stored hash values are too long, a document's fingerprint may be too faint for accurate comparison with other documents. In addition, there may potentially be a situation where an entire document is bypassed without having a single substring hash value saved for a fingerprint, and where another document has more hashes than necessary saved for a fingerprint.

Current methods of selecting substring hash values have been unable to strike a balance between saving a sufficient number of hash values adequate to index the contents of a document, but not saving an unnecessary number of hash values limiting system capacity.

Once a sufficient number of substring hash values saved are adequate to index the contents of a document, the hash values are sorted by value to generate an indices that can be quickly queried to identify matching content. For data sets having no special properties, standard algorithms used to sort a data set of N hash values representing the contents of documents require an amount of time proportional to N(log N). The log N factors results from the need to recursively sort and merge smaller and smaller problem sizes, with each instance being about ½ the size of the previous one. N hash values can be subdivided in half at most log N times. While the log N factor is inconsequential for small data sets, the log N levels of recursive sorting may contribute over one order of magnitude to the cost of sorting for large sets of hash values. This cost of sorting may become prohibitive as the sets of hash values to be sorted becomes large. As a result, for large data sets of hash values, there has been a need for methods and related systems for faster sorting in order to generate the required indices to be used to identify matching content.

These generated indices of sorted hash values are saved to disk, and current methods of querying the indices require a disk input/output to access the contents of the indices. Because of the time required to perform a disk input/output for each hash value to be queried against the indices greatly limits the speed in which queries of the indices can be performed, there has been a need for methods and related systems for faster querying of a disk based indices of hash values.

SUMMARY OF THE INVENTION

The present invention encompasses data processing methods and related systems for indexing the contents of documents for comparison with the contents of other documents to identify matching content.

A method for comparing the contents of a query document to the content on the World Wide Web is set forth. The contents of a query document are indexed and compared to content from the World Wide Web which is continuously retrieved and indexed. The method for indexing the contents of a document may comprise selecting substrings from the document, hashing the substrings to generate a plurality of hash values having a known range of values, selecting certain hash values to save from the generated hash values, and sorting the saved hash values. Methods for selecting certain hash values to save are set forth.

Another aspect of the invention sets forth a system for detecting partially or wholly duplicated documents on the World Wide Web. The system comprises a plurality of servers, with each server containing the indexed contents of a plurality of Universal Resource Locator pages, and a user interface for querying the indexed contents of the Universal Resource Locator pages.

Yet another aspect of the invention sets forth another method for comparing the contents of a query document to the content on the World Wide Web. The contents of a plurality of Universal Resource Locator pages from the World Wide Web are indexed and store on a plurality of servers. The contents of a query document are indexed and compared to the index of contents of the Universal Resource Locator pages from the World Wide Web.

The present invention is explained in more detail below with reference to the drawings.

BRIEF DESCRIPTION OF THE DRAWINGS

FIG. 1 is a flow chart showing a method of indexing the contents of a corpus of documents.

FIG. 2 is an example of text from a document and application of a method of the steps in FIG. 1 of substring selection and substring hashing.

FIG. 3 is a flow chart showing a method for winnowing a file of hash values during indexing of the contents of a corpus of documents.

FIG. 4 is an example file of hash values and application of the method of FIG. 3 to generate a table containing hash values selected to be saved.

FIG. 5 is a flow chart showing a method of sorting a file of hash values sorted by position to create a table of hash values sorted by value.

FIG. 6 is a flow chart showing a method of the step in the method of FIG. 5 sorting a file of hash values into buckets to create buckets that each contain a different range of hash values.

FIG. 7 is an example file of hash values and application of the method of FIG. 6.

FIG. 8 is an example of saved buckets on a storage medium and application of the method of FIG. 5.

FIG. 9 is a flow chart showing a method of generating a signature file summarizing the contents of a table of hash values.

FIG. 10 is an example table of hash values and application of the method of FIG. 9.

FIG. 11 is a system to search the worldwide web for document content comparison.

DETAILED DESCRIPTION OF THE PREFERRED EMBODIMENT

The present invention encompasses data processing methods and related systems for indexing the contents of documents for comparison with the contents of other documents to determine similarity and identify copying. The following description is presented to enable any person skilled in the art to make and use the invention, and is provided in the context of a particular application and its requirements. Various modifications to the preferred embodiment will be readily apparent to those skilled in the art, and the generic principles defined herein may be applied to other embodiments and applications without departing from the spirit and scope of the invention. Thus, the present invention is not intended to be limited to the embodiment shown, but is to be accorded the widest scope consistent with the principles and features disclosed herein.

A flowchart showing the steps in the overall process of indexing the contents of a corpus of documents in the presently preferred embodiment is shown in FIG. 1. Presently preferred embodiments of the invention at various steps in the overall process are discussed in detail below. At step 102, a corpus of documents is received for content indexing. Although the discussion here will focus on documents containing text, the documents may also contain various forms of multimedia, such as graphics, video, and audio. In the case where the documents contain text, the text may be in any of several formats, such as ASCII or Word, and the formats may have different digital representations even if appearing the same to a reader on a display device. At step 104, the content of the documents is extracted into a string of text with any special formatting removed.

At step 106, various substrings from the string of text are selected. A substring length parameter l is chosen which represents the number of alphanumeric characters in each substring. The substring length parameter l is chosen large enough to reduce accidental matches between documents. For example, it would be undesirable to find matches of the word "the" in every document. For normal text documents a substring length in the 30 to 40 character range is generally sufficient, while l may be in the 40 to 50 character range for computer programs depending on the programming language.

Although there are several methods in which the substrings may be selected, one method is to start at the beginning of the translated document with a position marker at the first character. The first substring is a window of text containing the first l characters of the translated string of text. The second substring is selected by incrementing the position marker by an increment amount, and selecting a window of l characters beginning with the character at which the position marker is placed after the increment by the increment count. In a present embodiment, the increment count is one character. This process is repeated until the end of the string of text is reached, each time incrementing the position marker by one character and selecting a new substring.

At step 108, a hash function is applied to each selected substring generating a hash value for each selected substring. Each hash value is associated with its position in the document by the location of the position marker at the first character of the text substring corresponding to the hash value. The hash values and their corresponding position data are saved for further processing in a data structure. In the present embodiment, a table is used. Since the substrings were hashed in the order of increasing position with the document, the table of hash values is sorted by increasing position.

Referring to FIG. 2, an example of text and the method of substring selection and hashing is shown. For a substring, length l of four characters, a first window 202 of size four characters is shown containing the characters "theq" 204. Note that spaces are skipped and not considered a character. A next window 206 is then selected which overlaps the first window 202, containing characters "hequ" 208. The process of selecting overlapping windows is repeated until the last substring text is reached, "nfox" 210. A table of hash values and associated positions is created by applying a hash function 212 to each selected substring of text, and associating the hash value with the position of the leftmost character of the substring hashed. The associated position values for each hash value are carried through all steps of the processing of the hash values, even if not specifically mentioned in the description of the hash value processing described below.

At step 110, the table of hash values and position data is reduced through a winnowing process by selecting only certain hash values to save for further processing and sorting. The winnowing process, described further below in reference to FIG. 3, comprises dividing the table of hash values into "windows" of hash values, and applying a fitness criterion to each window to select one hash value from each window.

At step 112, the table of selected hash values sorted by position is re-sorted by hash value using a radix sort, described further below in reference to FIGS. 5 and 6. The table of hash values indexing the contents of the documents sorted by hash value is then saved at step 114 on a storage medium for use in comparing similarity and identifying copying between the indexed documents and query documents. The table of hash values sorted by position is also retained.

A flow chart of a presently preferred embodiment of a method for winnowing a table of hash values sorted by position is shown in FIG. 3. For convenience, references to hash values and the saving of hash values also include the corresponding position information for each hash. The winnowing process described addresses the longstanding issue of how to save fewer hash values and yet still be able to provide a guarantee that a match of a particular size of text will be identified.

At step 302, a table of N hash values sorted by position generated at step 108 is read representing the contents of a corpus of documents. The general winnowing process of the present embodiment of the invention involves dividing the table of hash values into "windows" of hash values, and applying a fitness criterion to each window to select one "fit" hash value from each window. In a presently preferred embodiment of the invention, the fitness criterion applied involves selecting the minimum hash value in the window of hash values. However, any fitness criterion that selects one hash value out of the window of hash values can be used. Not all of the fit hashes are saved, but rather, only fit hashes that are not the same hash as the previous fit hash saved.

Referring to FIG. 3, an algorithm of the presently preferred embodiment of the invention for winnowing a table of hash files is shown. At step 304, a current window $W_i$ of size k hash values containing hash values $h_i \ldots h_{i+k-1}$ is chosen, where i is a counter variable initially set to one and k is the number of hash values in each window. The selection of the parameter k is based on the level of reduction of the table of hash values required, as the larger the value of k, the fewer the hash values selected for further processing and sorting.

At step 306, an overlapping next window $W_{i+1}$ of size k hash values containing hash values $h_{i+1} \ldots h_{i+k}$ is chosen. Thus, the next window contains all of the hash values of the current window except $h_i$, and contains one new hash value $h_{i+k}$ from the table of hash values. At step 308, the current minimum hash value in the current window is selected. At step 310, if the current minimum hash value is in the first position of the current window, $h_i$, then the minimum hash value in the next window $W_{i+1}$ is selected and saved. Since the minimum hash value in the current window is in the first position of the current window, it will not be one of the hash values in the next window, and thus a new minimum hash value in the next window must be selected.

If the current minimum hash value in the current window is not in the first position $h_i$, then the algorithm determines whether the next window contains a new minimum value. This is accomplished by comparing the current minimum hash value in the current window with the new hash value in the next window $h_{i+k}$, and selecting the minimum hash value. If the minimum hash value is $h_{i+k}$, then it is saved at step 312. If the minimum hash value remains the current minimum hash value, then nothing new is saved. Note that because the current window and next window are overlapping, if the current minimum hash value is not in the first position $h_i$ of the current window, then the current minimum hash value is also in the next window.

The process of selecting overlapping next windows is repeated until the end of the table of hash values is reached, each iteration determining whether there is a new minimum hash value in the next window. At step 314, the counter variable i is updated by one with each iteration, and as a result, what was the next window in the prior iteration becomes the current window. The number of windows for a file of N hash values and a window size K is N−K+1. Thus, if i<N−K+1 at step 316, another iteration is performed. After the end of the table of bash values is reached, a winnowed table of hash values has been produced and saved for further processing 318.

Referring to FIG. 4, an example table of selected hash values 402 is winnowed using the algorithm described in FIG. 3. If a window size of k equal to three is chosen, at the first iteration 404, where i=1, the current window $w_1$ 406 contains the hash values 67, 79, and 32. The next window $w_2$ 408 contains hash values 79, 32, and 15. The minimum hash value in the current window $w_1$ is 32. When compared to the new hash value in the next window 15, the minimum value is 15, which is then saved as the new minimum 409. At the next iteration 410, where i=2, the next window in the previous iteration is now the current window. The next window $w_3$ contains hash values 32, 15, and a new hash value from the table of hash values, 23. The current minimum, 15, is less than the new hash value in the next window, and thus the current minimum remains the same for this iteration and nothing new is saved to disk.

At the next iteration 412, where i=3, the next window $w_4$ contains hash values 15, 23, and 14. Since the new hash value in the next window, 14, is less than the current minimum, 14 is saved as the new current minimum 413. At the next two iterations 414 and 416, where i=4 and 5, the current minimum 14 is less than the new hash values in the windows $w_5$ and $w_6$, and therefore nothing new is saved. At the iteration 418, where i=6, the current minimum 14 is in the first position of window $w_6$, and therefore a new minimum must be selected and saved from the next window $w_7$ since 14 will no longer be in the next window. Since window $w_7$ consists of hash values 89, 16, and 46, the new minimum saved is 16 419. At the iteration 420, where i=7, the new hash value in the next window is not lower than 16, so nothing new is saved. At the iteration 422, where i=8, the current minimum 16 in the current window $w_8$ is in the first position of the window, so the minimum value in the next window $w_9$, 29, is selected and saved 423. The output of this process 424 is a table of selected hash values saved on disk.

The table of hash values and position data after winnowing representing the contents of the corpus of documents is ordered by increasing position within the corpus of documents since the substrings of text are selected and hashed by increasing position within the documents. It may be desirable to also have the contents of the corpus of documents indexed by hash value rather than position. When a query document is to be compared to the contents of the corpus of documents, hash values representing the contents of the query document can be compared to the table of hash values sorted by value to quickly identify the documents with matching content. The table of hash values 424 will be too large to fit in memory, and thus a method for sorting the table of hash values is needed that integrates interaction between a storage medium and memory.

Referring to FIGS. 5 and 6, a method for sorting the table of hash values and position data by hash value is shown that integrates interaction between a storage medium and memory. A portion of the table of selected hash values saved on a disk is read into memory at step 502. A counter variable i is initially set to 1 at step 504. At step 506, the hash values in memory are sorted into K collections of hash values, or "buckets", using a radix sort. The process of step 506 is set forth in detail in FIG. 6. At step 602, the total memory of size R is partitioned into K buckets of size B bytes. The determination of the number of buckets K and their size B to partition the memory of size R is based on several considerations relating to access and retrieval of the buckets which are described below.

Referring to FIG. 6, a method of partitioning hash values in memory into buckets by value is shown. Based on the number of buckets K and the total range of hash values M, the range of hash values to be partitioned into each bucket is calculated at step 604 by partitioning the hash space into K ranges of size M/K. At step 606, the hash values in memory are placed according to their value into the appropriate bucket in memory. At step 608, if the memory allocated to a bucket containing a particular range of hash values becomes full, the bucket is saved to disk and a new bucket containing the same range of hash values is started. This process is repeated until all hash values in the portion of the hash table read into memory have been sorted. At step 614, all buckets in memory are saved to disk. When the buckets are saved to disk, either when they become full or after all hash values have been placed in buckets, they are saved to disk into a sequential list. The range of hash values for each bucket written to disk is stored in a separate memory structure in RAM to be used in the next sorting phase to locate the data corresponding to a desired range of hash values. This memory structure takes negligible storage space compared to the rest of the algorithm. In the presently preferred embodiment, the memory structure used is an array.

Once the hash values in memory are sorted into buckets at step 506, all buckets containing the range of hash values between (i−1)M/K and i(M/K) are read into memory from disk at step 508. The buckets containing the same range of hash values are located using the array generated when the buckets were saved to disk, and the array is used to skip over the buckets that hold values outside the range of values being read. The result is N/K bytes of hash data, where N is the size of the hashed data, in bytes. The hash values are sorted in memory using a radix sort, which takes $E*N/K$ bytes of RAM, where E is the constant in O(N) space for a radix sort. Radix sorts are common to one skilled in the art, and may also be referred to as interpolation-insertion sorts and bucket sorts. The sort in memory is bound by the time to read the data in step 506.

After each iteration the sorted data is written out as a single list of sorted hash values at step 512, and the counter variable i is incremented by one at step 514. If i is not greater than the number of buckets k, then steps 508, 510, 512, and 514, and 516 are repeated until all the hash values for each range of hash values are sorted. Each iteration i produces a sorted list of all the hashes with the values in a range (i−1)M/K and iM/K, and concatenating these together by writing them sequentially produces a total list of size N with all of the hashes, sorted by value. At step 518, the next portion of the hash table on disk sorted by position is read into memory, and steps 504 to 518 are repeated until all of the hash values sorted by position are sorted by value.

The number of buckets (or sublists the hash list is split into) K that the memory R is partitioned into is dependent on several competing factors. The fewer the number of buckets/sublists, the larger the bucket size B of each bucket and the larger the range of hash values in each bucket. With large buckets saved on disk, at step 508 when all the buckets containing the same range of hash values are read into memory, the disk seek time, a parameter designated s, to access the disk is reduced because there are fewer buckets to access. With disk seek time reduced a larger percentage of the total time to sort the hash values can be devoted to reading data from the buckets on disk. However, the size of the buckets B cannot be so large that all of the buckets containing the same range of hash values cannot be read into memory at step 508.

The smallest I/O performed is B bytes (ignoring the partially full buckets that get saved to disk at step 614). In addition, because of the array generated indicating the contents of each bucket on disk, only one disk seek is required per each I/O since it is always known where to read or write data. If B is chosen to be $D*S*10$, where D is the total disk throughput (e.g., 15 MB/s*6 disks=90 MB/s), it is guaranteed that each read/write of an I/O operating takes 10 times more time than the seek time S that precedes it. For example, if D=90 MB/s and S=20 ms, then B=18 MB. In practice, not every operation will require a seek, and most seeks will be small, requiring only a few milliseconds, so the value of B required to reduce seeks to 10% of the total time is probably approximately 1–2 MB on standard hardware in 1999.

In determining the optimal number of buckets K to use, two requirements are considered. During step 506 when hash values are being sorted into buckets in memory, enough RAM R is required to store K buckets, so R>=K*B. During step 508, when all buckets containing the same range of hash values must be read into memory, enough memory RAM R is required to sort 1/K of all the hash values, so R>=E*N/K. Since the total amount of RAM required is the maximum over both of these phases involving steps 506 and 508, the optimal value of K is the one where both phases require the same amount of memory, so $K*B=E*N/K$. This leads to an optimal value of K at $K=\sqrt{E*N/B}$. The total amount of memory R required is therefore $\sqrt{E*N*B}$, since R=K*B.

The described methods assume that the hash values are sufficiently uniformly distributed that the radix sort runs in O(N) time and that all K ranges of hash values have approximately the same size N/K. If these assumptions fail, it may not be possible for all buckets containing the same range of hash values to be read into memory at step 508 and step 508 may require multiple iterations followed by additional passes over the data to merge the results, which may take as long as O(N*log(N)) instead of O(N). However, generally this will happen only if the hash distribution is extremely non-uniform, which is unlikely.

FIG. 7 is an example table of selected hash values and application of the method of FIG. 6 to sort the hash values into buckets. A table of hash values sorted by position is read into memory at step 702. For illustrative purposes, a main memory is divided into five buckets 704, with each bucket holding a maximum of 2 hash values. For a maximum range of hash values of 1 to 100, the range of hash values 706 for each of the five buckets can be calculated to be 20 hash values per bucket.

The hash values 702 are sorted by value into one of the five buckets. The first two hash values, 15 and 14, are sorted into the bucket containing hash values 1 to 20, shown in step 708. Since this bucket is now full, it is saved to disk, shown in 710, and a new bucket containing the range of hash values 1 to 20 is started. The next 5 hash values (16, 29, 45, 81, 56) from the hash values 702 are then sorted into the appropriate buckets by value. After the hash value 56 is sorted into the bucket containing hash values 41–60, this bucket reaches capacity and is written to disk, shown in step 712. After the hash value 27 is sorted into the bucket containing hash values 21–40, this bucket reaches capacity and is written to disk, shown in step 714. The next two hash values (21 and 35) are read and sorted, filling the bucket containing hash values 21–40 to capacity and resulting in it being saved to disk, shown in step 716. The remaining hash value (62) from the hash values 702 is then sorted, and all remaining buckets in memory are saved to disk 718.

Referring to FIG. 8, a group of buckets saved on disk is sorted using the method of FIG. 5. The group of buckets containing hash values in different ranges saved on disk in step 718 is shown recreated at 802. At step 804, all buckets containing hash values in the range 1 to 20 are read into memory and sorted with a radix sort by value. This sorted list is saved to disk 806. At step 808, all buckets containing hash values in the range of 21 to 40 are read into memory and sorted with a radix sort by value. These values are added to the previously saved hash values to disk 806. This process is repeated, each time reading into memory all the buckets containing the same range of hash values and using a radix sort to sort the hash values by memory. The result is a table of hash values 812 saved on disk sorted by value. Also note that each hash value in the table of hash values 812 has an associated position value which has been carried through the hash sorting process.

The table of hash values 812 saved on disk summarizing the contents of a corpus of documents can be queried against to determine whether the contents of a query document match the content of corpus of documents. However, the amount of disk I/O required to service user requests can make disk I/O impractical to determine whether each query hash value is in the table of hash values 812. For example, consider the case where a user submits a document to be queried against the table of hash vales 812 stored on a server. If a hash value is generated for every 30 characters in a document submitted to the server, and the average document size is 10 KB, at least 300 random I/Os are needed to match against the document. It is unlikely to obtain more than 50 random I/Os per second out of a single disk, which means that every fresh document sent to the server will tie up six disk seconds. Even using other means to speed up the processing time, such as spreading the hash table against multiple machines, the I/O requirements consume too much time to query large numbers of documents against the hash table on disk.

A solution to this problem in a current embodiment of the invention is to create a memory structure which summarizes the hash table and can be used to reduce the number of I/O requests. The memory structure is used to determine when a given hash value is not in the hash table on disk, which avoids a disk I/O for that particular hash value. In the presently preferred embodiment, the memory structure used is referred to as a signature file. The signature file of the present embodiment supports two operations: add a hash value and query for a hash value. The signature file algorithm of the present embodiment has the property that a query always returns true if a value has been previously added. When it returns false, it is certain that the hash value has not been added. However, it sometimes return true even when the value being queried has not been added, but with a known "false positive" probability that can be made low.

A current embodiment of a signature file is implemented as a bit array of some size f*L, where L is the total number of values that are to be added (i.e., the size of the disk index), and where f is a parameter that affects the "false positive" probability. Also required is a hash function that takes a value and an integer index, for example h(val, i), and produces independent values in the range 1 . . . f*L for any value of val or i. A second parameter, k, is the size of the "signatures." The signature of a val is the set {h(val, i)} as i varies from 1 to k, which is interpreted as a set of positions in the bit array. For any value of f (the size of the table), there is an ideal value of k that minimizes the false positive rate, which is calculated to be k=f*log 2. Alternatively, the signature of a val could be the results of applying a series of hash functions $H_1$ to $H_N$ to val, where N is the number of bits in the bit array with which each hash h in the table of hash values is associated.

Referring to FIG. 9, a flow chart for a method of generating a signature file summarizing the contents of a table of hash values is shown. At step 902, a signature file bit array in memory is generated of size 1 to M, where M is the range of potential hash values of a series of hash functions $H_1$ to $H_N$, and where N is the number of bits in the bit array with which each hash h in the table of hash values is associated. At step 904, the bit array generated in step 902 is initialized so that all of the bits are set to the same prescribed logical value. In the preferred embodiment, the bits are set to 0, but they could alternatively be all set to 1. At step 906, hash functions $H_1$ to $H_N$ are applied to each hash h in the table of hashes, generating N hash values for each hash h. At step 908, the corresponding bit positions to the N hash values generated for each hash h at step 906 are set to 1 if the bit array was initialized to 0. If the bit array were initialized to 1, then the corresponding bit positions to the N hash values generated for each hash h at step 906 are set to 0. At step 910, the signature file is saved to disk.

FIG. 10 shows the generation of a signature file from a table of hash values saved on disk. A bit array of size M is generated and initialized to 0 at step 1002. As defined earlier, M is the maximum hash value that a series of hash functions $H_1$ to $H_N$ will generate. At step 1004, a series of hash functions $H_1$ to $H_N$ are applied to the first hash value 14 in the table of hash values saved on disk, resulting in 3 new hash values: 5, 45, and 84 for the present example where N is equal to 3. The series of hash functions $H_1$ to $H_N$ is then applied to the second hash value 15 in the table of hash values, resulting in 3 new hash values: 9, 51, and 56. Hash functions $H_1$ to $H_N$ are applied to each hash value h in the table of hash values, ending with the last hash value 81, which generates new hash values 48, 87, and 89. At step 1006, all of the corresponding bit positions to the new hash values are set to one, in this example: 5, 45, 84, 9, 51, 56, 48, 87, and 89.

As described earlier, the purpose of generating a signature file is to develop a mechanism by which a table of hash values on disk too large to fit in memory can be queried to determine whether a hash value is not in the table without accessing the hash table on disk. When a query hash value $h_q$ is received to be compared against the hash table on disk, the signature file previously generated and saved on disk is read into memory. To query whether a hash value hq is in the table of h hashes, hash functions $H_1$ to $H_N$ used to generate the signature file at step 906 are applied to $h_q$. The bit positions corresponding to the new hash values generated from applying hash functions $H_1$ to $H_N$ to $h_q$ are then examined.

If the query hash value $h_q$ is on the hash table, then all of the new hash values generated from applying hash functions $H_1$ to $H_N$ will be the same as previously generated when creating the signature file. Thus, if any bit position in the signature file corresponding to the hash values generated by applying hash functions $H_1$ to $H_N$ to $h_q$ is zero, then it is certain that the query hash value $h_q$ is not in the table of hash values on disk. In contrast, because multiple hash functions $H_1$ to $H_N$ are being used and applied to multiple hash values to generate the signature file, there is the potential that even if all bit positions in the signature file corresponding to the hash values generated by applying hash functions $H_1$ to $H_N$ to $h_q$ are one, the query hash value may not be in the hash table on disk. As a result, if all of the bit positions corresponding to the hash values generated by applying hash functions $H_1$ to $H_N$ to $h_q$ are one, then it is indeterminate whether query hash value $h_q$ is in the table of hash values on disk and the disk must be accessed.

For example, take two query values, $h_{q1}=9$ and $h_{q2}=15$ and determine whether they are in the table of hash values 812 in FIG. 8 summarized by the signature file 1006 in FIG. 10. The hash functions $H_1$ to $H_N$ used in generating the signature file are applied to both $h_{q1}$ and $h_{q2}$.

For example purposes, assume for $h_{q1}$ that $H_1$ (9)=4, $H_2$ (9)=56, and $H_N$ (9)=51. These values are compared to the corresponding bit positions of the signature file 1006 to determine the bit values at these positions, which are 0, 1, and 1 respectively. Since one of the bit values is equal to 0, then it is certain that $h_{q1}$ is not in the table of hash values. The same process is repeated for $h_{q2}$. Assume that for $h_{q2}$ that $H_1$ (15)=9, $H_2$ (15)=51, and $H_N$ (15)=56. These values are compared to the corresponding bit positions of the signature file 1006 to determine the bit values at these positions, which are all 1. Since all of the bit values are 1, a disk I/O is required to determine whether $h_{q2}$ is in the table of hash values.

An alternative embodiment to using a signature file memory structure is to store a portion of each hash (such as the first byte) in memory indexed by the rest of the signature. When a hash from an unknown document arrives, the system can look it up in the hash table and check the byte in the table against the first byte of the hash value. If the hash value is on disk, it will definitely match. If it is not on disk, there may be a false positive so a disk I/O is required.

Once the table of selected hash values sorted by position are sorted to create a table of hashes sorted by hash value, a "document set identification number" (as termed by the inventor) or docset id number is generated for each hash value. The docset id number is used to associate with each unique hash value a number which identifies all of the documents in which that hash value appears. This docset id number is added as a third field to the table of selected hashes sorted by value for each hash, and is also added as a third field to the table of selected hash values sorted by position. The original table of selected hash values sorted by position is then discarded. The table of selected hash values sorted by position with docset ids is useful for quickly identifying shared content between a corpus of documents indexed.

A docset id number is generated for each hash in the table of hashes sorted by hash value. Since the table is sorted by hash values and indexes the contents of a corpus of documents, a hash value that appears in several documents will appear multiple times adjacent in the table with its associated position data. For example, the hash value 475 may appear in 3 documents at the positions <34,10007>, <39,475>, and <75,54> and <75, 8007>, where the first number within the brackets represents the document number and the second number represents the position within the document. Note that the hash value 475 appears in document 75 twice. Since all of the document and position information for each unique hash will appear adjacent in the table, the documents that each unique hash appear in can be quickly extracted without searching the entire table.

A docset id number is generated for each hash value by extracting the document numbers in which it appears from the position data, sorting the document numbers by value, removing duplicate document numbers, and then hashing the ordered set of document numbers. In the above example, the docset id number is generated by applying a hash function h to the document set (34, 39, 75). For example, h(34, 39, 75)=52 could represent the docset id number for the hash value 475. Docset id numbers are mapped to sets of document numbers in a table. The docset id number 52 is inserted into the hash table sorted by position wherever the hash value at a particular document and position is 475. This process is repeated for each hash in the table of hashes sorted by value. If the docset id number for a hash is just the hash of a single document number, then the hash only appears in the corpus of documents once.

The docset id number is particularly useful in that it allows segments of overlapping content between documents (and the specific documents in which such overlap occurs) to be identified. The docset id number is dependent on the set of documents a given hash is in. As a result, many different hashes that are each in the same set of documents will have the same docset identification number. If these docset id numbers are mapped to the corresponding hash value in the table of hash values sorted by position, long segments of content that are shared by multiple documents will be indicated by consecutive positions in the table that all have the same docset id number. For example, a portion of the table may appear as follows:

| Position | Hash Value | Docset Id Number |
|---|---|---|
| * | * | * |
| * | * | * |
| * | * | * |
| * | * | * |
| 34,1000 | 475 | 52 |
| 34,1030 | 510 | 52 |

-continued

| Position | Hash Value | Docset Id Number |
|---|---|---|
| 34,1060 | 480 | 52 |
| 34,1090 | 710 | 52 |
| * | * | * |
| * | * | * |
| * | * | * |
| * | * | * |

From this table it is easy to identify that the blocks of text in document 34 between positions 1000 and 1090 also appears in each of the documents in the set of documents corresponding to docset id number 52, which can be determined from the table mapping docset id numbers to sets of document numbers.

A system illustrating a potential application of hash tables and signature files generated using the methods of the present invention utilizes a user interface to search the World Wide Web for pages that share content with a corpus of documents specified by a user and identify duplication. In the preferred embodiment, the user interface is a server with capabilities of a personal computer. A hash table and signature file representing the contents of a corpus of documents is stored on the server. The hash table and signature file are generated according to the methods of the present invention.

There may be multiple hash tables and signature files stored on the server representing different corpus' of documents. For example, the corpus of documents could be a set of confidential documents that an individual or corporation wants to verify do not appear in a public forum, such as on the World Wide Web or an internet newsgroup. The corpus of documents could also be marketing material such as press releases that a corporation wishes to track to identify the amount of distribution and measure its impact. Instead of a corpus of documents, the user could also specify a URL address the contents of which are to be searched for, or the user could simply enter specific text to be searched for.

A user at the server specifies the corpus of documents to be searched for on the World Wide Web. Alternatively, other forums besides or in addition to the World Wide Web may be searched, such as newsgroups. The user may choose to systematically retrieve all pages from the World Wide Web to identify matching content with the corpus of documents. In this case, the server continually retrieve pages from the World Wide Web using a web crawler algorithm. Algorithms for retrieving pages from the World Wide Web on a systematic basis are well known in the literature to those of ordinary skill in the art. These algorithms are often referred to as crawling algorithms, robots, and spiders. Alternatively, the user may identify particular universal resource locator (URL) pages that are to be retrieved for comparison with the corpus of query documents. For example, the URLs for online news providers could be chosen as the pages to retrieve for comparison.

For each root URL page retrieved from the World Wide Web, every page reachable from the root pages is retrieved using a crawling algorithm that recursively follows links embedded in each retrieved page. Beginning with a list of URLs to be retrieved, which may contain as few as one URL address, the first URL is retrieved. In the presently preferred embodiment, no page with the same URL address is indexed twice unless has it has been altered since the last time it was retrieved. A simple checksum is calculated for each URL address at the time it is retrieved and stored for later comparison the next time the same URL address is retrieved. All the URL addresses in the body of the retrieved page are identified and appended to the list of URLs to retrieve. This process is repeated for each URL on the list. For newsgroups, content in the form of messages posted to a newsgroup are retrieved from a news server. Each time the news server is accessed, all new unexpired news messages since the previous access are downloaded.

The contents of each retrieved page or message not previously indexed are indexed and stored on the server in the manner of the invention described above to generate a table of hash values sorted by position. Each hash value in the index is queried against the signature file and hash table of the corpus of documents selected by the user to be searched for. The use of the signature file of the present invention reduces the number of disk input/outputs required, thus allowing the query process to be rapid enough for sustained continual downloading of content for comparison. Retrieved pages or messages with no matching hashes with the query corpus of documents index are discarded. Retrieved pages with at least one matching hash with the query corpus of documents and the index of contents of such pages with matching hashes are retained for a report to be sent to the user. Alternatively, the user may be given an option to preselect the criterion for determining whether a page with matching content is retained. For example, the user could be asked to specify the threshold number of hashes required to match in order for a retrieved page to be retained. As another example, the user may be asked to specify the minimum percentage of matching content that must be found for a retrieved page to be retained.

Reports containing pages with matching hash values are periodically sent to the user. Pages may be arranged by quantity of matching content, with pages with the most matching content displayed first. The report-pages may be displayed side by side with the pages from the documents of the query corpus of documents so the user can easily visualize the matching segments of content. Matching segments of content are identified by a matching hash value or matching sequence of hash values between the index of the corpus of query documents and the report page index. In certain circumstances after viewing matching content, a user may determine that certain content from the original query set of documents being found is not particularly useful, and may wish to eliminate such content from consideration when determining future matches. In such a case, the user can select this undesired text from a displayed report, and the corresponding hash values in the index of query documents are removed from consideration during the comparison process.

Referring to FIG. 11, another system for identifying matching content between a query document and the content of the World Wide Web is shown. A user interface (1110) and indexing server (1110) are connected to a plurality of servers (1120) containing content from the World Wide Web (1130). The user interface is a computer with a monitor. In alternative embodiments, the user interface (1100) and indexing server (1110) are not separate units, but combined into one machine capable of performing both user interface and indexing functions. The plurality of servers (1120) act in concert as one server, and are known as cluster architecture. After a query document is indexed at the indexing server (1110), the winnowed hashes are sent to each server in the plurality of servers (1120) where a query is performed for the winnowed hashes at each server. The results at each server are transmitted back to the user interface (1100) and merged for presentation to the user. The user selects a query document at the user interface (1100), and the system returns a set of matching World Wide Web pages that share content with the query document in ranking order. For each page, the percentage of overlap between the query document and the page is returned.

The contents of the World Wide Web (1130) are indexed according to the methods of the present invention, generating a table of hash values sorted by position and a table of hashes sorted by hash value for a plurality of URL addresses. Each unique URL is assigned a different document number. A signature file is also generated according to the methods of the present invention. In the preferred embodiment, this World Wide Web index is stored on a plurality of servers (1120), with each server containing a different portion of the index. The particular set of indexed URLs stored on each machine is arbitrary, but the quantity of data stored on each machine is approximately the same. Using present technology, each server is anticipated to store between two hundred and three hundred Gigabytes of data. Indexing of each set of URLs is done at the server level. In an alternative embodiment, when a search of the entire World Wide Web is not required, a single server may be used capable of storing the required World Wide Web index.

At the indexing server (1110), a query document selected by a user at a user interface (1100) to be searched for on the World Wide Web is indexed according to the methods of the present invention by selecting substrings, hashing the substrings, and winnowing the hashes. The query document may be data from a URL page, a document that has been uploaded onto the user interface (1100) from a storage device, or free text that has been entered into the user interface (1100). If the query document is a URL page, this process involves retrieving the URL page from the World Wide Web and indexing the URL page.

Once the query document is indexed, the winnowed hashes in the index are sent to each server in the plurality of servers (1120) using software at the indexing server (1110). At each server, each winnowed hash in the index is queried against the signature file of the table of hashes sorted by hash value of the World Wide Web index on the server to identify the document numbers that contain content which overlaps the query document and the matching hash/position pairs. If the signature file reports that the hash may be on the disk, then the winnowed hash is queried against the disk-based hash table index to identify matching document numbers and to retrieve any matching hash/position pairs. The document numbers are queried against the World Wide Web index table of hash values sorted by position to identify all of the position data and associated hash values for each overlapping document.

For each document, the number of matching hash values is divided by the total number of selected hash values for each respective document, producing a percentage overlap between the query document and the matching World Wide Web document. At each server, matching documents are ranked in order by either percentage of matching content or absolute number of hashes shared, depending upon user preference. The results from each server in the plurality of servers (1120) are transmitted to the user interface (1100) and merged by software to produce a single ranked list.

While the present invention has been particularly described with respect to the illustrated embodiments, it will be appreciated that various alterations, modifications and adaptations may be made based on the present disclosure, and are intended to be within the scope of the present invention. While the invention has been described in connection with what are presently considered to be the most practical and preferred embodiments, it is to be understood that the present invention is not limited to the disclosed embodiment but, on the contrary, is intended to cover various modifications and equivalent arrangements included within the scope of the appended claims.

What is claimed is:

1. A method for comparing the contents of a query document to the content on the World Wide Web, the method comprising:
  (a) indexing the contents of a query document including;
    selecting substrings from a query document;
    hashing said substrings to generate a plurality of hash values having a known range of values;
    selecting hash values to save from said plurality of hash values having a known range of values including;
      dividing the plurality of hash values into a plurality of overlapping windows of hash values;
      applying a fitness criterion to the hash values in each window of said overlapping windows to select a fit hash for each window; and
      saving said selected fit hash for each window.

2. The method of claim 1 including removing at least one of said selected fit hash for each window if the at least one of said selected fit hash that is removed is a duplicate occurrence of any fit hash previously selected for saving.

3. The method of claim 1 including:
  (b) retrieving content from the World Wide Web;
  (c) indexing said content from the World Wide Web;
  (d) comparing said World Wide Web index to said query document index; and
  (e) continuously repeating steps (b) through (d) for different content from the World Wide Web.

4. The method of claim 3 wherein indexing the contents of a query document includes sorting said selected hash values.

5. The method of claim 4, wherein said step of sorting said selected hash values having a known range of values comprises:
  partitioning said plurality of hash values into a plurality of buckets, each bucket of said plurality of buckets containing a different subset of said known range of values; and
  sorting for each subset of said known range of values said hash values within all buckets containing the same subset of said known range of values by value using a radix sort.
  writing to a single file on a storage medium the hash values sorted by value for each subset of said known range of values; and
  concatenating the hash values sorted by value for each subset of said known range of values to form one list of hash values sorted by value.

6. The method of claim 4, wherein said step of comparing said World Wide Web index to said query document index comprises:
  creating a memory structure which summarizes the selected hash values saved from a query document; and
  querying said memory structure to determine whether each selected hash value saved from the contents of the World Wide Web is not present in the selected hash values saved from a query document.

7. The method of claim 6, wherein said memory structure is a signature file.

8. The method of 7, wherein said step of creating a signature file which summarizes the selected hash values saved from a query document comprises:

creating a bit array in memory;

initializing all bit positions in said bit array to a prescribed logical value;

identifying bit positions in said bit array by applying a series of hash functions to each hash value in the selected hash values from the query document; and setting said identified bit positions in said bit array to the opposite value of said previously prescribed logical value.

9. The method of claim 8, wherein said step of querying said memory structure to determine whether each selected hash value saved from the contents of the World Wide Web is not present on said selected hash values from the query document comprises:

identifying query bit positions in said bit array to query by applying said series of hash functions to each selected hash value saved from the contents of the World Wide Web; and determining whether each selected hash value saved from the contents of the World Wide Web is not in the selected hash values from the query document by the value of said identified query bit positions in said bit array.

10. The method of claim 4, wherein said step of retrieving content from the World Wide Web comprises:

receiving a set of URLs identified by a user; and retrieving the content from said set of URLs.

11. The method of claim 4, wherein said step of retrieving content from the World Wide Web comprises using a web crawler algorithm.

12. The method of claim 4, wherein said step of retrieving content from the World Wide Web further comprises identifying whether the retrieved content has been modified since previously retrieved.

13. The method of claim 12, wherein said step of identifying whether the retrieved content has been modified since previously retrieved comprises calculating a checksum for each retrieved page.

14. A method for comparing the contents of a query document to the content on the World Wide Web, the method comprising:

(a) indexing the contents of a plurality of URLs from the World Wide Web including;

selecting substrings from the contents of a plurality of URLs from the World Wide Web;

hashing said substrings to generate a plurality of hash values having a known range of values;

selecting hash values to save from said plurality of hash values having a known range of values including;

dividing the plurality of hash values into a plurality of overlapping windows of hash values;

applying a fitness criterion to the hash values in each window of said overlapping windows to select a fit hash for each window; and saving said selected fit hash for each window; and (b) storing said index of contents of a plurality of URLs from the World Wide Web on a plurality of servers;

(c) indexing the contents of a query document; and (d) comparing said query document index to said index of contents of the World Wide Web.

15. The method of claim 14 including removing at least one of said selected fit hash for each window if the at least one of said selected fit hash that is removed is a duplicate occurrence of any fit hash previously selected for saving.

16. The method of claim 14 wherein indexing the contents of a plurality of URLs includes sorting said selected hash values.

17. The method of claim 16, wherein said step of sorting said selected hash values having a known range of values comprises:

partitioning said plurality of hash values into a plurality of buckets, each bucket of said plurality of buckets containing a different subset of said known range of values; and sorting for each subset of said known range of values said hash values within all buckets containing the same subset of said known range of values by value using a radix sort.

writing to a single file on a storage medium the hash values sorted by value for each subset of said known range of values; and concatenating the hash values sorted by value for each subset of said known range of values to form one list of hash values sorted by value.

18. The method of claim 14, wherein said step of comparing said query document index to said index of contents of the World Wide Web comprises:

creating a memory structure which summarizes the selected hash values saved from the contents of a plurality of URLs; and querying said memory structure to determine whether each selected hash value from the contents of a query document not present in the selected hash values saved from the contents of a plurality of URLs.

19. The method of claim 18, wherein said memory structure is a signature file.

20. The method of claim 19, wherein said step of creating a signature file which summarizes the selected hash values from the contents of a plurality of URLs comprises:

creating a bit array in memory;

initializing all bit positions in said bit array to a prescribed logical value;

identifying bit positions in said bit array by applying a series of hash functions to each hash value in the selected hash values saved from the contents of a plurality of URLs; and setting said identified bit positions in said bit array to the opposite value of said previously prescribed logical value.

21. The method of claim 20, wherein said step of querying said memory structure to determine whether each selected hash value from a query document is not present on said selected hash values from the contents of a plurality of URLs comprises:

identifying query bit positions in said bit array by applying said series of hash functions to each selected hash value saved from a query document; and determining whether each selected hash value saved from a query document is not in the selected hash values by the value of said identified query bit positions in said bit array.

* * * * *